(12) United States Patent
Mowrer

(10) Patent No.: US 8,809,468 B2
(45) Date of Patent: Aug. 19, 2014

(54) EPOXY SILOXANE COATING COMPOSITIONS

(75) Inventor: Norman R. Mowrer, Cumming, GA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 81 days.

(21) Appl. No.: 13/415,925

(22) Filed: Mar. 9, 2012

(65) Prior Publication Data

US 2013/0236649 A1 Sep. 12, 2013

(51) Int. Cl.
*C08G 77/16* (2006.01)
*C08G 77/18* (2006.01)

(52) U.S. Cl.
USPC ........................................................ 525/476

(58) Field of Classification Search
USPC ........................................................ 525/476
See application file for complete search history.

(56) References Cited

U.S. PATENT DOCUMENTS

| | | | |
|---|---|---|---|
| 2,371,480 A * | 3/1945 | Paden et al. .................... | 544/202 |
| 2006/0058451 A1 | 3/2006 | Gommans et al. | |
| 2009/0234071 A1 | 9/2009 | Martz | |

FOREIGN PATENT DOCUMENTS

WO 2010 054984 * 5/2010

OTHER PUBLICATIONS

Ha A. Pham et al., "Epoxy Resins", Encyclopedia of Polymer Science and Technology, Jan. 1, 2001, pp. 1-127, XPOO7920796, pp. 709,713, 761-768 and p. 782.
Notification of Transmittal of The International Search Report and the Written Opinion of the International Searching Authority, or the Declaration, International Application No. PCT/US2013/029802, Dated Jul. 2, 2013.

* cited by examiner

*Primary Examiner* — Kuo-Liang Peng
(74) *Attorney, Agent, or Firm* — Noland Cheung

(57) ABSTRACT

Epoxy-polysiloxane based coating and flooring compositions exhibiting improved flexibility, and excellent weatherability and corrosion resistance after curing are described. The epoxy-polysiloxane polymer coating composition may be prepared by combining a polysiloxane, an epoxide resin material and a cure system including a blend of compounds selected from a dialkoxy functional aminosilane, a trialkoxy functional aminosilane, and an amino functional polysiloxane resin, where the blend has an average alkoxy functionality value ranging from 2.0 to 2.8.

24 Claims, No Drawings

EPOXY SILOXANE COATING COMPOSITIONS

FIELD OF INVENTION

The present disclosure is directed to epoxy resin based compositions useful for protective coatings and the like and, more specifically, to epoxy-polysiloxane polymer compositions having improved properties of flexibility, weatherability, and reduced shrinkage along with corrosion resistance, compressive strength and chemical resistance comparable to conventional epoxy polysiloxane coating formulations.

BACKGROUND

Epoxy coating materials are well known and have gained commercial acceptance as protective and decorative coatings for steel, aluminum, galvanizing, wood and concrete in maintenance, marine, construction, architectural, aircraft, automotive, flooring, and product finishing markets. The basic raw materials used to prepare these coatings generally comprise as essential components (a) an epoxy resin, (b) a hardener, and (c) pigment, aggregate, or other components.

The epoxide resins are those having more than one 1,2-epoxy group per molecule and may be saturated or unsaturated, aliphatic, cycloaliphatic, or heterocyclic. The epoxy resins generally contain glycidyl ester or glycidyl ether groups and have a weight per epoxide of from about 100 to about 5,000. The hardener is typically chosen from the general classes of aliphatic amines or aliphatic amine adducts, polyamides, polyamidoamines, cycloaliphatic amines, aromatic amines, Mannich bases, ketimines, and carboxylic derivatives. Pigments and aggregates include, for example, titanium dioxide and other inorganic and organic color pigments, silica, barium sulfate, magnesium silicate, calcium silicate, fumed silica, garnet, feldspar, carbon black and the like.

Epoxy based protective coatings represent one of the most widely used methods of corrosion control. They may be used to provide long term protection of steel, concrete, aluminum, and other structures under a broad range of corrosive conditions, extending from atmospheric exposure to full immersion in strongly corrosive solutions. For over 20 years, these coatings have been formulated from either a solid or liquid epoxy resin cured with an aliphatic polyamine or polyamide resin, e.g., Shell Epon 1001, or Epon 828 epoxy resins cured with diethylene triamine (DETA) or Versamid 100 series polyamides. In typical two package coating systems, the epoxy resin component is usually the vehicle for pigment grinding and dispersion of other aggregates and various additives.

Epoxy based protective coatings posses many properties which make them desirable as coating materials. They are readily available and are easily applied by a variety of methods including spraying, rolling and brushing. They adhere well to steel, concrete and other substrates, have low moisture vapor transmission rates, act as barriers to water, chloride and sulfate ion ingress, provide excellent corrosion protection under a variety of atmospheric exposure conditions and have good resistance to many chemicals and solvents.

Epoxy based materials may also be formulated as surfacers or flooring materials primarily for application over concrete. For example, one commercially successful epoxy based flooring material utilizes liquid bisphenol A epoxy resin and a modified aliphatic polyamine combined with graded silica sand aggregate.

Certain epoxy based coating and flooring materials may not display good resistance to weathering in sunlight. While such coatings may maintain their chemical and corrosion resistance, exposure to the ultraviolet (UV) light component of sunlight may result in a surface degradation phenomenon known as chalking which changes both the color and gloss retention of the original coating. Where color and gloss retention is desired or required, epoxy protective coatings are typically top-coated with a more weatherable coating, such as an alkyd, vinyl or aliphatic polyurethane coating. The end result is a two or sometimes three coat system which provides the desired corrosion resistance and weatherability, but which is also labor intensive and expensive to apply.

In addition, epoxy based coating and flooring materials require resistance to mechanical abuse. For example, coated materials may be subjected to impact or flexing which may result in cracking or other imperfections in the epoxy coating. Subsequent exposure to weathering or chemicals may result in contact with chemicals and the underlying surface materials, potentially resulting in oxidation of the underlying material, degradation of the epoxy coating from the underside, and/or release of the epoxy coating from the surface.

While epoxy based coating and flooring materials have gained wide commercial acceptance, the need nevertheless remains for epoxy based materials with improved chemical and corrosion resistance, resistance to mechanical abuse (such as flexing or impact), and improved color or gloss retention. Epoxy coatings and flooring materials with improved color and gloss retention are needed wherever they may be exposed to sunlight. An epoxy coating which doesn't chalk and does not require a weatherable topcoat is desirable. Coating and flooring materials with improved chemical, corrosion, impact, flex, and abrasion resistance are needed for both primary and secondary chemical containment structures, for protecting steel and concrete in chemical, power generation, railcar, sewage and waste water treatment, automotive, and paper and pulp processing industries Improved epoxy based flooring materials are needed in industrial environments such as shipping and receiving docks where heavy impact loading can be anticipated, for floors which must be repeatedly cleaned with steam and aggressive chemicals, such as those found in food processing, meat packaging and beverage industries and where spills of caustic, acid and highly reactive chemicals cannot be avoided.

Therefore, the present disclosure provides for new epoxy based coating and flooring compositions displaying one or more of improved chemical resistance, resistance to weathering, corrosion resistance, resistance to mechanical abuse, flexibility, high tensile and compressive strength, and excellent resistance impact and abrasion.

SUMMARY OF THE INVENTION

The present disclosure provides new epoxy-polysiloxane polymer coating compositions. According to a first embodiment, the present disclosure provides an epoxy-polysiloxane polymer coating composition comprising water, a polysiloxane having the formula:

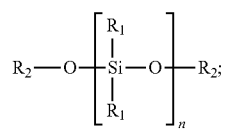

a non-aromatic epoxide resin having more than one 1,2-epoxide group per molecule with an epoxide equivalent weight in the range of from 100 to 5,000; and a cure system comprising a blend of alkoxy functional aminosilanes, where the blend has an average alkoxy functionality value ranging from 2.0 to 2.8 and wherein the combined composition reacts to form a cross-linked epoxy polysiloxane polymer structure. According to the polysiloxane formula, each $R_1$ is selected from a hydroxy group or alkyl, aryl, or alkoxy groups having up to six carbon atoms, each $R_2$ is selected from hydrogen or alkyl or aryl groups having up to six carbon atoms, and where n is selected so that the molecular weight for the polysiloxane is in the range of 400 to 10,000.

In another embodiment, the present disclosure provides an epoxy-polysiloxane polymer coating composition comprising water, from 20% to 80% by weight of a polysiloxane having the formula:

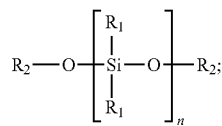

from 20% to 80% by weight of a non-aromatic epoxide resin having more than one 1,2-epoxide group per molecule with an epoxide equivalent weight in the range of from 100 to 5,000; up to 15% by weight of a cure accelerator comprising a tin catalyst in the form of an octanoate, a dodecanoate, or a naphthanate; up to 15% by weight of a flexible epoxy resin based on the glycidyl ether of castor oil having an epoxide equivalent weight in the range of 200 to 1,000; and from 5% to 40% by weight of a cure system comprising a blend of at least one dialkoxy functional aminosilane and at least one trialkoxy functional aminosilane, where the blend has an average alkoxy functionality value ranging from 2.0 to 2.8 and is added in an amount sufficient to provide an amine equivalent to epoxide equivalent ratio of from 0.7:1.0 to 1.3:1.0 in the coating composition and wherein the combined composition reacts to form a cross-linked epoxy polysiloxane polymer structure. According to polysiloxane formula, each $R_1$ is selected from a hydroxy group or alkyl, aryl, or alkoxy groups having up to six carbon atoms, each $R_2$ is selected from hydrogen or alkyl or aryl groups having up to six carbon atoms, and where n is selected so that the molecular weight for the polysiloxane is in the range of 400 to 10,000. The dialkoxy functional aminosilane has a general formula

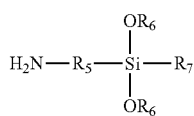

and the trialkoxy functional aminosilane has a general formula

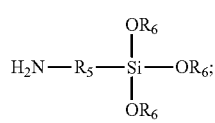

where each $R_5$ is a difunctional organic radical independently selected from aryl, alkyl, dialkylaryl, alkoxyalkyl, alkylaminoalkyl, or cycloalkyl radicals, and $R_6$ and $R_7$ are each independently selected from alkyl, hydroxyalkyl, alkoxyalkyl, or hydroxyalkoxyalkyl groups wherein the $R_6$ and $R_7$ groups each contain less than about six carbon atoms.

In another embodiment, the present disclosure provides a method for protecting a surface of a substrate from the undesired effects of one or more of chemicals, corrosion, and weather by coating the surface with a coating composition prepared by the method comprising preparing a resin composition, adding a cure system to the resin component to form a fully cured epoxy-modified polysiloxane coating composition, where the blend has an average alkoxy functionality value ranging from 2.0 to 2.8 and wherein the combined composition reacts to form a cross-linked epoxy polysiloxane polymer structure, and applying the coating composition to the surface of a substrate to be protected before the composition becomes fully cured. The resin composition comprises water, a polysiloxane having the formula:

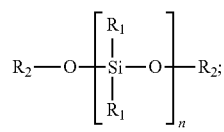

a non-aromatic epoxide resin having more than one 1,2-epoxide group per molecule with an epoxide equivalent weight in the range of from 100 to 5,000. According to the polysiloxane formula, each $R_1$ is selected from a hydroxy group or alkyl, aryl, or alkoxy groups having up to six carbon atoms, each $R_2$ is selected from hydrogen or alkyl or aryl groups having up to six carbon atoms, and where n is selected so that the molecular weight for the polysiloxane is in the range of 400 to 10,000. The cure system comprises a blend of at least one dialkoxy functional aminosilane and at least one trialkoxy functional aminosilane, and optionally a cure accelerator comprising at least one metal catalyst.

DETAILED DESCRIPTION

The present disclosure provides epoxy-modified polysiloxane coating compositions displaying improved properties over conventional epoxy polysiloxane materials. When formulated as a coating material, compositions according to the various embodiments of the present disclosure display improved properties, such as, but not limited to, resistance to chemicals, resistance to corrosion or oxidation, and/or improved weatherability for the surface coated with the coating composition, compared to surfaces coated with conventional epoxy-modified polysiloxane coating compositions.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As used herein, unless otherwise expressly specified, all numbers such as those expressing values, ranges, amounts or percentages may be read as if prefaced by the word "about", even if the term does not expressly appear. Accordingly, unless indicated to the contrary, the numerical values set forth in the following specification can claims can vary depending upon the desired properties sought to be obtained by the practice of the invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the various embodiments of the disclosure are approximations, the numerical values set forth in the specific examples are reported as precisely as possible. Any numerical value, however, inherently contains certain errors necessarily resulting from the standard variation found in their respective testing measurements.

According to various embodiments, the present disclosure provides for an epoxy-polysiloxane polymer coating composition suitable for coating surfaces and providing improved chemical, corrosion, and/or weather resistance. The epoxy-polysiloxane polymer coating may comprise water, a resin component comprising a polysiloxane and a non-aromatic epoxide resin, and a cure system, wherein the combined composition reacts to form a cross-linked epoxy-polysiloxane polymer structure. In certain embodiments the coating composition may further comprise a flexible epoxy rein based on a glycidyl ether of castor oil. In other embodiments, the coating composition may optionally comprise a cure accelerator comprising at least one metal catalyst.

With respect to the resin component, the resin may comprise a blend of a polysiloxane, an epoxide resin, and optionally a organooxysilane. With respect to the polysiloxane used to make up the resin component, various embodiments of the polysiloxanes include, but are not limited to, those having Formula I:

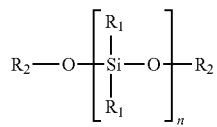

where each $R_1$ may be selected from the group consisting of the hydroxy group and alkyl, aryl, and alkoxy groups having up to six carbon atoms. Each $R_2$ may be selected from the group consisting of hydrogen and alkyl and aryl groups having up to six carbon atoms. In Formula I, n may be an integer selected so that the molecular weight of the polysiloxane is in the range of about 400 to about 10,000 Daltons. In specific embodiments, the $R_1$ and $R_2$ may comprise groups having less than six carbon atoms, for example, to facilitate rapid hydrolysis of the polysiloxane, which reaction may be driven by the volatility of the alcohol analog product of the hydrolysis. In certain embodiments, $R_1$ and $R_2$ groups having greater than six carbon atoms may impair the hydrolysis of the polysiloxane due to the relatively low volatility of each alcohol analog. Methoxy, ethoxy and silanol functional polysiloxanes having n selected such that the molecular weights are about 400 to about 2000 may be used in specific embodiments for formulating coating compositions of the present disclosure.

According to the various embodiments, suitable methoxy functional polysiloxanes may include: DC-3074 and DC-3037 commercially available from Dow Corning; GE SR191 and SY-550 commercially available from Wacker located in Adrian, Mich. Silanol functional polysiloxanes include, but are not limited to, Dow Corning's DC840, Z6018, Q1-2530 and 6-2230 intermediates. According to various embodiments, the coating composition may comprise from about 20% to about 80% by weight of the polysiloxane. In other embodiments, the coating composition may comprise from about 15% to about 65% by weight of the polysiloxane. In one embodiment, the coating composition may comprise approximately 31% by weight of the polysiloxane.

Suitable epoxy resins useful in forming coating embodiments of this disclosure may include non-aromatic epoxy resins that contain more than one and in certain embodiments, two 1,2-epoxy groups per molecule. As used herein, the terms "epoxide resin" and "epoxy resin" are used interchangeably. In particular embodiments, the epoxide resins may be liquid rather than solid and may have an epoxide equivalent weight of about 100 to about 5,000, in other embodiments ranging from about 100 to about 2,000, and still other embodiments ranging from about 100 to 500, and have a reactivity of about two.

In certain embodiments, the epoxide resins may be non-aromatic hydrogenated cyclohexane dimethanol and diglycidyl ethers of hydrogenated Bisphenol A-type epoxide resin, such as Eponex 1510, and Eponex 1513 (hydrogenated bisphenol A-epichlorohydrin epoxy resin) commercially available from Shell Chemical, Houston, Tex.; Santolink LSE-120 commercially available from Monsanto, Springfield, Mass.; Epodil 757 (cyclohexane dimethanol diglycidylether) commercially available from Pacific Anchor, Allentown, Pa.; Araldite XUGY358 and PY327 commercially available from Ciba Geigy, Hawthorne, N.Y.; Epirez 505 commercially available from Rhone-Poulene, Lousiville, Ky.; Aroflint 393 and 607 commercially available from Reichold, Pensacola, Fla.; and ERL4221 commercially available from Union Carbide, Tarrytown, N.Y. Other suitable non-aromatic epoxy resin may include EP-4080E (cycloaliphatic epoxy resin) commercially available from Adeka, Japan; DER 732 and DER 736. In specific embodiments, the epoxy resin may be EP-4080E. Such non-aromatic hydrogenated epoxide resins may be desired for their limited reactivity of about two, which promote formation of a linear epoxy polymer and prohibits formation of a cross-linked epoxy polymer. Without intending to be limited to a specific interpretation, it is believed that the resulting linear epoxy polymer formed by adding the hardener to the epoxide resin may be at least partially responsible for the enhanced weatherability of this composition.

According to various embodiments, the coating composition may comprise from about 20% to about 80% by weight of the epoxide resin, and in other embodiment from about 15% to about 45% by weight of epoxide resin. According to one embodiment, the coating composition may comprise about 26% by weight of the non-aromatic epoxide resin.

The various embodiments of the coating compositions comprise a cure system. According to these embodiments, the cure system may comprise a blend of one or more alkoxy functional aminosilanes. In certain embodiments, the blend of alkoxy functional aminosilanes may have an average alkoxy functionality value ranging from about 2.0 to about 2.8. In other embodiments, the blend of alkoxy functional aminosilanes may have an average alkoxy functionality value ranging from about 2.2 to about 2.8. In specific embodiments, the cure system may comprise from about 5% to about 40% by weight of the coating composition, and in other embodiment from about 10% to about 30% by weight of the coating composition. According to one embodiment, the cure system may comprise about 14% by weight of the coating composition. In certain embodiments, the cure system is added in an amount sufficient to provide an amine equivalent to epoxide equivalent ratio of from about 0.7:1.0 to about 1.3:1.0 in the coating composition, and in other embodiments a ratio of from about 0.95:1.00 to about 1.05:1.00.

In one embodiment the blend of alkoxy functional aminosilanes may comprise at least one dialkoxy functional aminosilanes, wherein the blend has an average alkoxy functionality value of about 2.0. According to these embodiments, the at least one dialkoxy functional aminosilane may have a structure:

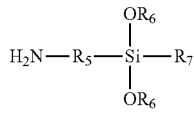

According to the structure of dialkoxy functional aminosilanes, $R_5$ may be a difunctional organic radical independently selected from the group consisting of aryl, alkyl, dialkylaryl, alkoxyalkyl, alkylaminoalkyl, and cycloalkyl radicals, each alkyl, aryl, cycloalkyl, and alkoxy group containing up to 6 carbon atoms, and each $R_6$ and $R_7$ may be independently selected from alkyl, hydroxyalkyl, alkoxyalkyl or hydroxyalkoxyalkyl groups wherein each alkyl, aryl, cycloalkyl, and alkoxy group in the $R_6$ and $R_7$ groups contain up to 6 carbon atoms. According to specific embodiments, each $R_6$ and $R_7$ group may be independently chosen from $(C_1-C_6)$alkyl groups and each $R_5$ is independently chosen from $(C_1-C_6)$ alkyl groups and $(C_1-C_6)$alkylamino$(C_1-C_6)$alkyl groups. For example, suitable dialkoxy functional aminosilanes may include aminopropylmethyldimethoxysilane, aminopropylethyldimethoxysilane, aminopropylethyldiethoxysilane, N-β-aminoethyl-γ-aminopropylmethyldimethoxysilane, N-2-aminoethyl-3-aminoisobutyl-methyldimethoxysilane, and aminoneohexylmethyldimethoxysilane. Examples of suitable commercially available dialkoxy functional aminosilanes include DYNASYLAN® 1505 (aminopropylmethyldimethoxysilane having an amine equivalent weight of 81.57, commercially available from Evonik Degussa Corp., USA) and SILQUEST® A-2639 (aminoneohexylmethyldimethoxysilane having an amine equivalent weight of 102.7, commercially available from Crompton OSi Specialties, South Charleston, W. Va.), and SILQUEST® A-2120 (N-beta-(aminoethyl)-gamma-aminopropylmethyldimethoxysilane).

According to other embodiments the cure system may comprise a blend of at least one dialkoxy functional aminosilane and at least one trialkoxy functional aminosilane. According to these embodiments, the cure system blend may have an average alkoxy functionality value ranging from about 2.2 to about 2.8, and in certain embodiments, from about 2.28 to about 2.73. Suitable dialkoxy functional aminosilanes for use in various embodiments described herein may have a structure:

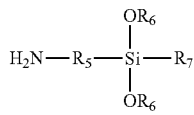

and suitable trialkoxy functional aminosilanes for use in various embodiments described herein may have a structure:

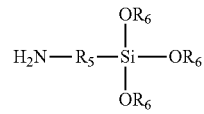

According to the structure of dialkoxy functional aminosilanes and the trialkoxy functional aminosilanes, $R_5$ may be a difunctional organic radical independently selected from the group consisting of aryl, alkyl, dialkylaryl, alkoxyalkyl, alkylaminoalkyl, and cycloalkyl radicals, each alkyl, aryl, cycloalkyl, and alkoxy group containing up to 6 carbon atoms, and each $R_6$ and $R_7$ may be independently selected from alkyl, hydroxyalkyl, alkoxyalkyl or hydroxyalkoxyalkyl groups wherein each alkyl, aryl, cycloalkyl, and alkoxy group in the $R_6$ and $R_7$ groups contains up to 6 carbon atoms. According to specific embodiments, each $R_6$ and $R_7$ group may be independently chosen from $(C_1-C_6)$alkyl groups and each $R_5$ is independently chosen from $(C_1-C_6)$alkyl groups and $(C_1-C_6)$alkylamino$(C_1-C_6)$alkyl groups. Suitable dialkoxy functional aminosilanes are described herein. Suitable trialkoxy functional aminosilanes may include aminopropyltrimethoxysilane, aminopropyltriethoxysilane, aminopropyltripropoxysilane, aminoneohexyltrimethoxysilane, N-β-(aminoethyl)-γ-aminopropyltrimethoxysilane, N-β-(aminoethyl)-γ-aminopropyltriethoxysilane, N-phenylaminopropyl trimethoxysilane, trimethoxysilylpropyl diethylene triamine, 3-(3-aminophenoxy)propyl trimethoxysilane, aminoethyl aminomethyl phenyl trimethoxysilane, 2-aminoethyl-3-aminopropyl-tris-2-ethylhexoxysilane, N-aminohexyl aminopropyl trimethoxysilane, and trisaminopropyl trismethoxy ethoxy silane. Examples of suitable commercially available dialkoxy functional aminosilanes include SILQUEST® A-1100 (aminopropyltrimethoxysilane having an amine equivalent weight of 89.7), SILQUEST® A-1110 (aminopropyltriethoxysilane having an amine equivalent weight of 111), SILQUEST® A-1120 (N-beta-(aminoethyl)-gamma-aminopropytrimethoxysilane), and SILQUEST® A-1637, commercially available from Crompton OSi Specialties, South Charleston, W. Va. Other suitable trialkoxy functional aminosilanes include those set forth in U.S. Pat. No. 7,459,515 at column 10, lines 38-65, incorporated herein by this reference.

According to those embodiments where the cure system comprises a blend of at least one dialkoxy functional aminosilane and at least one trialkoxy functional aminosilane, the aminosilanes are mixed together in a ratio to provide the desired average alkoxy functionality value. The at least one dialkoxy functional aminosilane will have an average alkoxy functionality value of 2.0 and the at least one trialkoxy functional aminosilane will have an average alkoxy functionality value of 3.0 and the blend of the alkoxy aminosilanes will have an average alkoxy functionality value ranging from about 2.2 to about 2.8. For example, the blend may comprise between from about 20% to about 80% by weight of the dialkoxy functional aminosilane and from about 80% to about 20% by weight of the trialkoxy functional aminosilane, based on the total weight of aminosilane in the blend. In other embodiments, the blend may comprise from about 27% to about 73% by weight of the dialkoxy functional aminosilane and from about 72% to about 28% by weight of the trialkoxy functional aminosilane, based on the total weight of aminosilane in the blend.

In other embodiments, the cure system may comprise at least one trialkoxy functional aminosilane and at least one amino functional polysiloxane resin. According to these embodiments of the cure system, the at least one trialkoxy functional aminosilane may have a structure as set forth herein. The amino functional polysiloxane resin may have a general structure

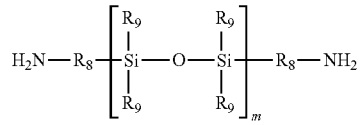

According to the structure of the amino functional polysiloxane resin, each $R_8$ may be a difunctional organic radical independently selected from the group consisting of aryl, alkyl, dialkylaryl, alkoxyalkyl, alkylaminoalkyl, and cycloalkyl radicals, each $R_9$ may independently selected from the group consisting of aryl, phenyl, $(C_1-C_4)$alkyl, $(C_1-C_4)$ alkoxy, and —$OSi(R_9)_2R_8NH_2$. The polysiloxane may have a structure where m is selected so that the blend has an amine equivalent weight ranging from about 112 to about 250. In various embodiments, the cure system will have an alkoxy content (wt % alkoxy) of between 10% and 25% by weight. In certain embodiments, the cure system blend may have an average alkoxy functionality ranging from between 2.2 to 2.8 and in certain embodiments form about 2.26 to about 2.78. In specific embodiments, $R_9$ may be selected from phenyl, methyl, methoxy, —$OSi(R_9)_2R_8NH_2$ and mixtures of any thereof. In specific embodiments, the amino functional polysiloxane resin may comprise methyl and phenyl substitution at $R_9$. For example, according to one embodiment, the amino functional polysiloxane resin may be SILRES® HP2000 an amino functional, methyl phenyl silicone resin, having an amine equivalent weight of 230-255, commercially available from Wacker Chemical Corporation, Adrian, Mich. Other commercially available or proprietary amino functional polysiloxane resins having methyl and phenyl substitution at $R_9$ may also be suited for various embodiments of the cure system. In certain embodiments, the cure system comprising at least one trialkoxy functional aminosilane and the amino functional polysiloxane resin may comprise from about 15% to about 85% by weight of the trialkoxy functional aminosilane and from about 85% to about 15% of the amino functional polysiloxane resin. In specific embodiments, the cure system may comprise from about 70% to about 85% of the trialkoxy functional aminosilane and from about 15% to about 30% of the amino functional polysiloxane resin.

Specific embodiments of the cure system may further comprise a cure accelerator. The cure accelerator may be a metal catalyst in the form of an organometallic catalyst comprising the one or more metal. Cure accelerators comprising at least one organometallic catalyst may be useful for the purpose of further accelerating the curing rate of the coating composition into a protective film coating over a broad temperature range. In certain uses requiring an ambient temperature cure of the coating composition, the organometallic catalyst cure accelerator may provide accelerated cure rates at the ambient temperature. Suitable cure accelerator may include at least one metal catalyst comprising a metal selected from zinc, manganese, zirconium, titanium, cobalt, iron, lead, bismuth, or tin and having the formula

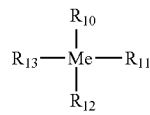

where "Me" is the metal, $R_{10}$ and $R_{11}$ may be independently selected from acyl groups, alkyl groups, aryl groups, or alkoxy groups, wherein the acyl, alkyl, aryl and alkoxy groups may each have up to twelve carbon atoms. $R_{12}$ and $R_{13}$ may be selected from those groups set forth for $R_{10}$ and $R_{11}$ or from inorganic atoms such as halogens, sulfur or oxygen. In specific embodiments the $R_{10}$, $R_{11}$, $R_{12}$ and $R_{13}$ groups may be selected from butyl, acetates, laurates, octanoates, neodecanoates or naphthanates. In specific embodiments, the cure accelerator may be an organometallic tin catalyst or titanium catalyst, such as, for example, dibutyl tin dilaurate, dibutyl tin diacetate, dibutyl tin diacetyldiacetonate, dioctyltindilaurate, dioctyltindiacetate, or organotitanates. In certain embodiments, the cure system may comprise up to about 10% by weight of the cure accelerator, and in other embodiments from about 0.02% to about 7% by weight of the cure accelerator, based on the total weight of the cure system.

In the epoxy polysiloxane coating compositions of the present disclosure, the proportion of the cure system to resin component may vary over a wide range. The coating compositions, according to one embodiment described herein, may comprise from about 20% to about 80% by weight of the polysiloxane, form about 20% to about 80% by weight of the non-aromatic epoxy resin, and from about 5% to about 40% by weight of the cure system.

In specific embodiments, the coating compositions of the present disclosure may further comprise a flexible epoxy resin, such as a flexible resin based on the glycidyl ether of castor oil, CAS No. 74398-71-3. For example, in certain embodiments the flexible epoxy resin may be a glycidyl ether of castor oil having an epoxide equivalent in the range of about 200 to about 1,000. Examples of suitable glycidyl ethers of castor oil include, but are not limited to, Heloxy™ 505, a castor oil polyglycidyl ether having an epoxide equivalent of from 200 to 500, commercially available from Momentive Specialty Chemicals, Columbus, Ohio, as well as other commercially available castor oil polyglycidyl ethers under CAS No. 74398-71-3. Other suitable flexible epoxy resins may include Erisys GE-22 diglycidylether of cyclohexanedimethanol, Erisys GE-36 diglycidylether of polyoxypropyleneglycol, Erisys GE-60 sorbitol glycidyl ether (the Erisys line of diglycidyl ethers are commercially available from CVC Specialty Chemicals, Moorestown, N.J.) and CoatOSil* 2810 di-epoxy functional polydimethylsiloxane (commercially available from Momentive Specialty Chemicals, Columbus, Ohio). The flexible epoxy resin may be included in the coating composition where the coating composition comprises up to about 15% by weight of the flexible epoxy resin. In other embodiments, the coating composition may comprise from about 2% to about 15% by weight of the flexible epoxy resin, or even from about 5% to about 15% by weight of the flexible epoxy resin.

According to certain embodiments, the coating composition may optionally comprise one or more organooxysilane. With respect to the optional organooxysilane used in certain embodiments, the organooxysilane may have the general formula:

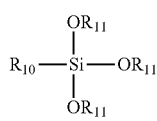

where $R_{10}$ may be selected from alkyl or cycloalkyl groups containing up to six carbon atoms or aryl groups containing up to ten carbon atoms. $R_{11}$ is independently selected from alkyl, hydroxyalkyl, alkoxyalkyl, or hydroxyalkyoxyalkyl groups containing up to six carbon atoms. In one embodiment, $R_{11}$ may comprise groups having up to six carbon atoms, for example, to facilitate rapid hydrolysis of the organooxysilane, which reaction may be driven by the evaporation of the alcohol analog product of the hydrolysis. Without intending to be limited, it is believed that $R_{11}$ groups having greater than six carbon atoms may impair the hydrolysis of the organooxysilane due to the relatively low volatility of each alcohol analog. In specific embodiment comprising the organooxysilane, the silane may be a trialkoxysilane, such as Union Carbide's A-163 (methyl trimethoxysilane), A-162, and A-137 and Dow Corning's Z6070 and Z6124. According to those embodiments which may comprise an organooxysilane, the coating composition may comprise from about 1% to about 10% by weight of the organooxysilane. In one embodiment the coating composition may optionally comprise in the range of from about 0.1% to about 10% percent by weight organooxysilane or even from about 0.7% to about 5% by weight organooxysilane.

According to various embodiments, the coating compositions may comprise one or more other components, including but not limited to, including mono- and di-epoxides, corrosion inhibitors, moisture scavengers, pigments, aggregates, rheological modifiers, plasticizers, antifoam agents, adhesion promoters, suspending agents, thixotropic agents, catalysts, pigment wetting agents, bituminous and asphaltic extenders, antisettling agents, diluents, UV light stabilizers, air release agents, dispersing aids, solvents, surfactants, or mixtures of any thereof. One of ordinary skill in the resin coating compositions art would understand that other common components may be incorporated into the coating composition within the scope of the various embodiments of the disclosures described herein. In specific embodiments, the epoxy polysiloxane coating composition may comprise up to about 10% by weight of such components.

In certain embodiments, the coating composition may additionally comprise one or more corrosion inhibitor. Examples of suitable corrosion inhibitors include, but are not limited to, zinc phosphate based corrosion inhibitors, for example, micronized HALOX® SZP-391, HALOX® 430 calcium phosphate, HALOX® ZP zinc phosphate, HALOX® SW-111 strontium phosphosilicate, HALOX® 720 mixed metal phosphor-carbonate, and HALOX® 550 and 650 proprietary organic corrosion inhibitors commercially available from Halox, Hammond, Ind. Other suitable corrosion inhibitors may include HEUCOPHOS® ZPA zinc aluminum phosphate and HEUCOPHOS® ZMP zinc molybdenum phosphate, commercially available from Heucotech Ltd, Fairless Hills, Pa. Corrosion inhibitors may be included into the coating composition in amounts ranging from about 1% to about 7% by weight. Various embodiments of the coating composition may additionally comprise one or more light stabilizers, such as liquid hindered amine light stabilizers ("HALS") or UV light stabilizers. Examples of suitable HALS include, for example, TINUVIN® HALS compounds such as TINUVIN® 292, TINUVIN® 123, TINUVIN® 622, TINUVIN® 783, TINUVIN® 770 commercially available from BASF, Ludwigshafen, Germany. Examples of suitable UV light stabilizers include, for example, CYASORB® light stabilizers, such as CYASORB® UV-1164L (2,4-bis(2,4-dimethylphenyl-6-(2-hydroxy-4-isooctyloxyphenyl-1,3,5-triazine), commercially available from Cytec Industries, Woodland Park, N.J. and TINUVIN® 1130 and TINUVIN® 328 commercially available from BASF, Ludwigshafen, Germany. The one or more light stabilizer may be included into the coating composition in amounts ranging from about 0.25% to about 4.0% by weight.

Suitable pigments for certain embodiments of the coating compositions may be selected from organic or inorganic color pigments and may include, for example, titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment that may be used to form the composition is understood to vary, depending on the particular composition application, and can be zero when a clear composition is desired. In various embodiments, the epoxy polysiloxane composition may comprise up to about 50 percent by weight fine particle size pigment and/or aggregate. In some embodiments, using greater than 50 percent by weight fine particle size pigment and/or aggregate ingredient may produce a composition that can be too viscous for application. In certain compositions where it is desirable to have more than 50% pigment or aggregate in the final composition, such as a zinc rich primer which contains up to about 90% zinc in the dry film or flooring composition which may contain up to about 80% pigment/aggregate, the pigment or aggregate may be packaged separately as a third component. Depending on the particular end use, certain embodiments of the coating compositions may comprise from about 20% to 35% by weight fine particle size aggregate and/or pigment.

The pigment and/or aggregate ingredient may typically be added to the epoxy resin portion of the resin component, for example, by dispersing with a Cowles mixer to at least 3 Hegman fineness of grind, or alternatively may be ball milled or sand milled to the same fineness of grind before addition of the polysiloxane ingredient. In certain embodiments, selection of a fine particle size pigment or aggregate and dispersion or milling to about 3 Hegman grind allows for the atomization of mixed resin and cure components with conventional air, air-assisted airless, airless and electrostatic spray equipment, and may provide a smooth, uniform surface appearance after application.

Various embodiments of the epoxy-polysiloxane compositions of this disclosure may be formulated for application with conventional air, airless, air-assisted airless and electrostatic spray equipment, brush, or roller. Certain embodiments of the compositions may be used as protective coatings for steel, galvanizing, aluminum, concrete and other substrates at dry film thicknesses in the range of from 25 micrometers to about two millimeters. Accordingly, pigment or aggregate ingredients useful in forming the composition of the present disclosure may be selected from a fine particle size material, for example but not limited to, having at least 90 weight percent greater than 325 mesh U.S. sieve size.

In various embodiments, the present coating composition may comprise water and the water may be present in an amount sufficient to bring about both the hydrolysis of the polysiloxane and the subsequent condensation of the silanols.

Non-limiting sources of water may include atmospheric humidity and adsorbed moisture on the pigment or aggregate material. Additional water may be added, for example, to accelerate cure depending on ambient conditions, such as the use of the coating and flooring composition in arid environments. Certain embodiments of the epoxy-polysiloxane composition may comprise up to a stoichiometric amount of water to facilitate hydrolysis. Compositions that are prepared without added water may not contain the amount of moisture needed for the hydrolysis and condensation reactions, and may therefore produce a composition product having an insufficient degree of ultraviolet, corrosion and chemical resistance. Compositions that are prepared using greater than about two percent by weight water tend to hydrolyze and polymerize to form an undesirable gel before application. In one specific embodiment, the epoxy-polysiloxane composition may be prepared by using approximately 1% by weight water.

If desired, water may be added to either the epoxide resin. Other sources of water may include trace amounts present in the epoxide resin, cure system, thinning solvent, or other ingredients. Regardless of its source, the total amount of water used should be the stoichiometric amount needed to facilitate the hydrolysis reaction. Water exceeding the stoichiometric amount may be undesirable since excess water may act to reduce the surface gloss of the finally-cured composition product.

According to certain embodiments, the present disclosure provides for an epoxy-polysiloxane polymer coating composition comprising water, from about 20% to about 80% by weight of a polysiloxane having the general formula I

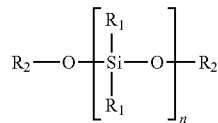

where $R_1$, $R_2$ and n are as described herein, from about 20% to about 80% by weight of a non-aromatic epoxide resin having more than one 1,2-epoxide group per molecule and with an epoxide equivalent weight in the range of from about 100 to about 5,000, up to about 15% by weight of a cure accelerator comprising a tin organometallic catalyst in the form of an octanoates, a dodecanoate, or a naphthanate, up to about 15% by weight of a flexible epoxy resin based on the glycidyl ether of castor oil having an epoxide equivalent weight in the range of about 200 to about 1,000, and from about 5% to about 40% by weight of a cure system comprising a blend of at least one dialkoxy functional aminosilane and at least one trialkoxy functional aminosilane, wherein the blend has an average alkoxy functionality value ranging from about 2.0 to about 2.8, and wherein the combined coating composition reacts to form a cross-linked epoxy polysiloxane polymeric structure. According to these embodiments, the dialkoxy functional aminosilane may have the structure

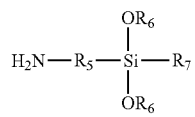

and the trialkoxy functional aminosilane may have the structure

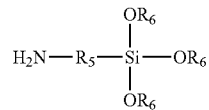

where each $R_5$, $R_6$, and $R_7$ are independently as described herein.

Epoxy-polysiloxane compositions according to various embodiments of the present disclosure are generally low in viscosity and can be spray applied without the addition of a solvent. However, in certain embodiments organic solvents may be added to improve atomization and application with electrostatic spray equipment or to improve flow, leveling and/or appearance when applied by brush, roller, or standard air and airless spray equipment. Exemplary solvents useful for this purpose include, but are not limited to, esters, ethers, alcohols, ketones, glycols and the like. In certain embodiment, the amount of solvent added to compositions of the present disclosure may be limited by government regulation under the Clean Air Act to approximately 420 grams solvent per liter of the composition.

Certain embodiment of the epoxy-polysiloxane compositions of the present disclosure may be supplied as a two-package system, for example, in moisture proof containers. The first package may contain the epoxy resin, polysiloxane resin, any pigment and/or aggregate ingredient, additives and/or solvent if desired. The second package may contain the cure system, comprising one or more of the dialkoxy aminosilanes, trialkoxy aminosilanes, amino functional polysiloxanes, and/or optionally catalysts or accelerating agents. Certain embodiments of the coating compositions of the present disclosure may be supplied as 3-package systems where the pigment and/or aggregate are supplied in a separate package e.g. for a flooring/concrete protection formulation or a zinc-rich primer coating.

Epoxy-polysiloxane compositions according to the present disclosure can be applied and fully cure at ambient temperature conditions in the range of from about −6° C. to 50° C. At temperatures below −18° C. cure may be slowed. However, the coating compositions of various embodiments of the present disclosure may be applied under bake or cure temperatures up to 40° C. to 120° C.

While not wishing to be bound by any particular theory, it is believed that the embodiments of the epoxy-polysiloxane coating compositions described herein are cured by: (1) the reaction of the epoxy resin with the cure system to form epoxy polymer chains; (2) the hydrolytic polycondensation of the polysiloxane ingredient to produce alcohol and polysiloxane polymer; and (3) the copolymerization of the epoxy polymer chains with the polysiloxane polymer to form a fully-cured epoxy-polysiloxane polymer composition. When an aminosilane or amino functional polysiloxane are used to make up the cure system, the amine moiety of the aminosilane or amino functional polysiloxane undergoes the epoxy-amine addition reaction and the silane moiety of the aminosilane or amino functional polysiloxane undergoes hydrolytic polycondensation with the polysiloxane. In its cured form, the epoxy-polysiloxane coating composition may exist as a uniformly dispersed arrangement of linear epoxy chain fragments that are cross-linked with a continuous polysiloxane polymer chain, thereby forming a non-interpenetrating polymer network (IPN) chemical structure that has substantial advantages over conventional epoxy systems.

In preparing the various embodiments of the epoxy polysiloxane coating compositions of the present disclosure, the proportion of curing composition to resin component may vary over a wide range. In general, the epoxy resin may be cured with sufficient cure system where amine hydrogens react with the epoxide group of the epoxy resin to form epoxy chain polymers and to react with the polysiloxane to form polysiloxane polymers, where the epoxy chain polymers and polysiloxane polymers may copolymerize to form the cured cross-linked epoxy polysiloxane polymer composition. In certain embodiments, the epoxy resin component may be cured with sufficient cure system to provide from about 0.7 to about 1.3 amine equivalent weight per 1 epoxide equivalent weight. In other embodiments, the epoxy resin component may be cured with sufficient cure system to provide from about 0.95 to about 1.05 amine equivalent weight per 1 epoxide equivalent weight.

When the ingredients of the two or three component system are combined, it is believed that the silane moiety of the cure system condenses with the polysiloxane ingredient, and the epoxy resin undergoes chain extension with by reaction with the amino groups pendent from the polysiloxane to form a fully-cured epoxy-polysiloxane polymer composition. In such reaction it is believed that the epoxy resin functions as a cross-linking enhancer that adds to the cross-link density of the composition without diminishing the beneficial features of the polysiloxane.

Ultimately, the chemical and physical properties of the epoxy-polysiloxane composition of the present disclosure may be affected by judicious choice of epoxy resin, polysiloxane, cure system and other optional components, such as pigment or aggregate components. Various embodiments of the epoxy-polysiloxane coating composition that can be prepared by combining the components as described herein displays improved resistance to caustic, is weatherable, corrosion resistance, flexibility, allows infinite recoatability, provides abrasion resistance better than conventional epoxy-polysiloxane coating compositions. Epoxy-polysiloxane coating compositions of the present disclosure may exhibit an unexpected and surprising improvement in chemical corrosion and weathering resistance as well as high tensile and compressive strength, flexibility, and excellent impact and abrasion resistance.

Certain embodiments of the present disclosure may also include a coated substrate comprising a substrate having at least one surface coated with a coating composition according to an embodiment described herein. Coating compositions of the present disclosure may be applied to a desired substrate surface to protect it from weathering, impact, and exposure to corrosion and/or chemical(s). Illustrative substrates that may be treated using the coating compositions described herein include, but are not limited to, wood, plastic, concrete, vitreous surfaces, and metallic surfaces. Coating compositions according to the embodiments described herein may find use as a top coating disposed either directly onto the substrate surface itself or disposed onto one or more prior or other underlying coating, e.g., an inorganic or organic primer coating, disposed on the substrate surface to achieve a desired purpose.

Embodiments of the present disclosure provide a method for protecting a surface of a substrate from the undesired effects of one or more of chemical(s), corrosion, and weather by coating at least one surface of the substrate, such as a substrate as described herein, with a coating composition prepared by a method comprising forming a resin component, adding a cure system to the resin component to form a fully cured epoxy-modified polysiloxane coating composition, and applying the coating composition to the at least one surface of the substrate to be protected before the coating composition becomes fully cured. The resin component may be formed by combining water, a polysiloxane having formula I, and a non-aromatic epoxide resin having more than one 1,2-epoxide group per molecule with an epoxide equivalent weight in the range of from about 100 to about 5,000. The cure system may be as described herein and in one embodiment may comprise a blend of at least one dialkoxy functional aminosilane and at least one trialkoxy functional aminosilane and optionally a cure accelerator comprising at least one metal catalyst, where the blend has an average alkoxy functionality value ranging from about 2.0 to about 2.8. In certain embodiments, the resin component may further include a flexible epoxy resin based on a glycidyl ether of castor oil having an epoxide equivalent weight in the range of about 200 to about 1,000.

Coating compositions of the various embodiments described herein can be applied to a surface to be treated by conventional techniques such as spraying or brushing or the like, and are usually applied in films of from about 50 to about 250 micrometers in thickness, or in some embodiments up to about 1.5 millimeters in thickness. If necessary, multiple layers of the coating composition may be applied to the surface to be protected. For example, for use with a wooden substrate, such as in the furniture industry, the coating may be applied with a dry film thickness of about 75 to about 125 micrometers to provide a desired degree of protection to the underlying surface. On other surface structures, coatings of appropriate thickness may be applied to provide the desired level of protection. The coating composition, once applied to the at least one surface of the substrate may be allowed to cure at ambient temperature until fully cured or, alternatively, may be cured at an elevated temperature, from ambient temperature up to 150° C.-200° C., for example, by placing the coated substrate in a drying or curing oven. The substrate may be removed from the oven after complete curing of the coating composition or after partial curing of the coating composition, after which the coating composition may continue to cure on the substrate at ambient temperature until complete cure is attained.

These and other features of the various embodiments of the present disclosure will become more apparent upon consideration of the following examples. The various embodiments of this disclosure described in the following examples are not to be considered as limiting the invention to their details. All parts and percentages in the examples, as well as throughout this specification, are by weight unless otherwise indicated.

EXAMPLES

The following examples describe the preparation of various embodiments of the coating composition as used for coating purposes.

In these examples, exemplary epoxy siloxane coating systems according to the present disclosure are formulated and tested for weatherability, durability, corrosion resistance and chemical resistance and compared with comparative coating systems.

Example 1

Preparation of Resin Component Formulation A

The resin component for the formulation were prepared as follows. A cycloaliphatic epoxy resin (Adeka EP-4080E, 256.3 g, commercially available from Adeka Corporation, Tokyo, Japan) was weight into a 1 liter stainless steel mixing vessel and placed under a Hockmeyer mixer fitted with a Cowles blade. Surfactant (RHODAFAC® RE 610, 4.2 g, commercially available from Solvay, Rhodia Group, New Brunswick, N.J.) and defoamer (Foamtrol, 4.4 g, commercially available from Munzing NA, Bloomfield, N.J.) were added to the mixing vessel while mixing at low speed followed by addition of a thixotrope (CRAYVALLAC® extra, 16.3 g, commercially available from Palmer Holland Inc. North Olmsted, Ohio). The batch was then dispersed at high speed while bringing the temperature of the mixture to 71° C. (160° F.). These conditions were held for 30 minutes. The batch was then cooled to 49° C. (120° F.) while stirring at slow speed. Titanium dioxide (TIOXIDE® TR60, 401.8 g, commercially available from Huntsman, The Woodlands, Tex.) at a rate that is sufficient to avoid agglomeration. After addition of the $TiO_2$, the batch was mixed at high speed for 20 minutes until a 6 Hegman grind was obtained. The remaining components, including a corrosion inhibitor (HALOX® SZP-391 JM, 55.5 g, commercially available from Halox, Hammond, Ind.); silicone resin (DC-3074, 384.8 g, commercially available from Dow Corning, Midland, Mich.); a flexible epoxy resin (Heloxy™ 505, 71.6 g, commercially available from Momentive Specialty Chemicals, Columbus, Ohio); a HALS light stabilizer (TINUVIN® 292, 40.0 g, commercially available from BASF, Ludwigshafen, Germany); and silicone additives BYK-307 (3.9 g) and BYK-361N (6.0 g) (commercially available from BYK, Wallingford, Conn.) were then added to the mixture and the batch was mixed until uniform and then poured into a 1 quart can for storage as Resin Component A. The components and weights are presented in Table 1.

Example 2

Preparation of Resin Component Formulation B

The resin component for the formulation were prepared as follows. A cycloaliphatic epoxy resin (Adeka EP-4080E, 570.3 g, commercially available from Adeka Corporation, Tokyo, Japan) was weight into a 1 liter stainless steel mixing vessel and placed under a Hockmeyer mixer fitted with a Cowles blade. Surfactant (RHODAFAC® RE 610, 4.2 g, commercially available from Solvay, Rhodia Group, New Brunswick, N.J.) and defoamer (Foamtrol, 4.4 g, commercially available from Munzing NA, Bloomfield, N.J.) were added to the mixing vessel while mixing at low speed followed by addition of a thixotrope (CRAYVALLAC® extra, 16.3 g, commercially available from Palmer Holland Inc. North Olmsted, Ohio). The batch was then dispersed at high speed while bringing the temperature of the mixture to 71° C. (160° F.). These conditions were held for 30 minutes. The batch was then cooled to 49° C. (120° F.) while stirring at slow speed. Titanium dioxide (TIOXIDE® TR60, 401.8 g, commercially available from Huntsman, The Woodlands, Tex.) at a rate that is sufficient to avoid agglomeration. After addition of the $TiO_2$, the batch was mixed at high speed for 20 minutes until a 6 Hegman grind was obtained. The remaining components, including a corrosion inhibitor (HALOX® SZP-391 JM, 55.5 g, commercially available from Halox, Hammond, Ind.); silicone resin (DC-3074, 113.0 g, commercially available from Dow Corning, Midland, Mich.); a flexible epoxy resin (Heloxy™ 505, 70.0 g, commercially available from Momentive Specialty Chemicals, Columbus, Ohio); a HALS light stabilizer (TINUVIN® 292, 40.0 g, commercially available from BASF, Ludwigshafen, Germany); and silicone additives DC-57 (4.1 g, commercially available from Dow Corning, Midland, Mich.) and BYK-361N (11.0 g, commercially available from BYK, Wallingford, Conn.) were then added to the mixture and the batch was mixed until uniform and then poured into a 1 quart can for storage as Resin Component B. The components and weights are presented in Table 1.

Example 3

Preparation of Comparative Resin Component Formulation C

The resin component for the formulation were prepared as follows. A cycloaliphatic epoxy resin (Adeka EP-4080E, 355.4 g, commercially available from Adeka Corporation, Tokyo, Japan) was weight into a 1 liter stainless steel mixing vessel and placed under a Hockmeyer mixer fitted with a Cowles blade. Surfactant (Rhodafac RE610, 5.0 g, commercially available from Solvay, Rhodia Group, New Brunswick, N.J.) and defoamer (Foamtrol, 5.3 g, commercially available from Munzing NA, Bloomfield, N.J.) were added to the mixing vessel while mixing at low speed followed by addition of a thixotrope (DISPARLON® 6500, 7.7 g, commercially available from King Industries, Norwalk, Conn.). The batch was then dispersed at high speed while bringing the temperature of the mixture to 71° C. (160° F.). These conditions were held for 30 minutes. The batch was then cooled to 49° C. (120° F.) while stirring at slow speed. Titanium dioxide (TIOXIDE® TR60, 401.4 g, commercially available from Huntsman, The Woodlands, Tex.) at a rate that is sufficient to avoid agglomeration. After addition of the $TiO_2$, the batch was mixed at high speed for 20 minutes until a 6 Hegman grind was obtained. The remaining components, including a silicone resin (DC-3074, 402.6 g, commercially available from Dow Corning, Midland, Mich.); a HALS light stabilizer (TINUVIN® 292, 22.9 g, commercially available from BASF, Ludwigshafen, Germany); and silicone additives DC-57 (4.1 g, commercially available from Dow Corning, Midland, Mich.) and BYK-361N(11.0 g, commercially available from BYK, Wallingford, Conn.) were then added to the mixture and the batch was mixed until uniform and then poured into a 1 quart can for storage as comparative Resin Component C. The components and weights are presented in Table 1.

TABLE 1

Resin Component Formulation

| | Ingredient | | A | B | C comparative example |
|---|---|---|---|---|---|
| | | | Weights in grams | | |
| 1 | Adeka EP-4080E | Cycloaliphatic epoxy resin | 256.3 | 570.3 | 355.4 |
| 2 | RHODAFAC ® RE 610 | Surfactant | 4.2 | 4.2 | 5 |

TABLE 1-continued

Resin Component Formulation

| Ingredient | | A | B | C comparative example |
|---|---|---|---|---|
| | | Weights in grams | | |
| 3 Foamtrol 110 | Defoamer | 4.4 | 4.4 | 5.3 |
| 4 CRAYVALLAC ® extra | Thixatrope | 16.3 | 16.3 | — |
| 5 DISPARLON ® 6500 | Thixatrope | — | — | 7.7 |
| 6 TIOXIDE ® TR60 | Titanium dioxide | 401.8 | 401.8 | 401.4 |
| 7 HALOX ® SZP-391 JM | Corrosion inhibitor | 55.5 | 55.5 | — |
| 8 DC-3074 | Silicone resin | 384.8 | 113.0 | 402.6 |
| 9 Heloxy 505 | Flexible epoxy resin | 71.6 | 70.0 | — |
| 10 TINUVIN ® 292 | HALS light stabilizer | 40.0 | 40.0 | 22.9 |
| 11 BYK-307 | Silicone additive | 3.9 | — | — |
| 12 DC-57 | Silicone additive | — | 4.1 | 4.1 |
| 12 BYK-361N | Silicone additive | 6.0 | 11.0 | 11.0 |

Example 4

Preparation of Cure Systems

In this example, cure systems 1, 2, 3 and 4 according to embodiments of the present disclosure were prepared, along with comparative cure system 5. The components and amounts for each cure system is presented in Table 2. The components were weighted into a 1 pint container, sealed and placed on a shaker for 5 minutes to provide cure systems 1, 2, 3, 4 and comparative cure system 5.

Cure system 1 was prepared by combining a dialkoxy functional aminosilane (DYNASYLAN® 1505, 93.2 g, commercially available from Evonik Degussa Corp, USA) with a metal catalyst cure accelerator (T-1, dibutyltin diacetate, 6.8 g, commercially available from Air Products, Allentown, Pa.). The resulting cure system had an average alkoxy functionality of 2.0.

Cure system 2 was prepared by combining a dialkoxy functional aminosilane (DYNASYLAN® 1505, 25.0 g, commercially available from Evonik Degussa Corp, USA) and a trialkoxy functional aminosilane (SILQUEST® A1110, 68.2 g, commercially available from Crompton OSi Specialties, South Charleston, W. Va.) with a metal catalyst cure accelerator (T-1, dibutyltin diacetate, 6.8 g, commercially available from Air Products, Allentown, Pa.). The resulting cure system had an average alkoxy functionality of 2.73.

Cure system 3 was prepared by combining a dialkoxy functional aminosilane (DYNASYLAN® 1505, 67.3 g, commercially available from Evonik Degussa Corp, USA) and a trialkoxy functional aminosilane (SILQUEST® A1110, 25.9 g, commercially available from Crompton OSi Specialties, South Charleston, W. Va.) with a metal catalyst cure accelerator (T-1, dibutyltin diacetate, 6.8 g, commercially available from Air Products, Allentown, Pa.). The resulting cure system had an average alkoxy functionality of 2.28.

Cure system 4 was prepared by combining a trialkoxy functional aminosilane SILQUEST® A1110, 23.2 g, commercially available from Crompton OSi Specialties, South Charleston, W. Va.) and an amino functional polysiloxane resin (SILRES® HP-2000, 70.0 g, commercially available from Wacker Chemical Corporation, Adrian Mich.) with a metal catalyst cure accelerator (T-1, dibutyltin diacetate, 6.8 g, commercially available from Air Products, Allentown, Pa.).

Comparative cure system 5 was prepared by combining a trialkoxy functional aminosilane (SILQUEST® A1100, 93.2 g, commercially available from Crompton OSi Specialties, South Charleston, W. Va.) with a metal catalyst cure accelerator (T-1, dibutyltin diacetate, 6.8 g, commercially available from Air Products, Allentown, Pa.). The resulting cure system had an average alkoxy functionality of 3.0.

TABLE 2

Cure System Formulation

| Ingredient | Cure Sys 1 | Cure Sys 2 | Cure Sys 3 | Cure Sys 4 | Cure Sys 5 Comparative |
|---|---|---|---|---|---|
| DYNASYLAN ® 1505 | 93.2 | 25.0 | 67.3 | — | — |
| SILQUEST ® A1100 | — | — | — | — | 93.2 |
| SILQUEST ® A1110 | — | 68.2 | 25.9 | 23.2 | — |
| HP-2000 | — | — | — | 70.0 | — |
| T-1 tin catalyst | 6.8 | 6.8 | 6.8 | 6.8 | 6.8 |
| Avg. alkoxy functionality | 2.0 | 2.73 | 2.28 | | 3 |
| Alkoxy wt % | 34.7 | 44.6 | 41.6 | 19.7 | 50.1 |

Example 4

Coating Formulations

Coating formulations according to certain embodiments of the present invention were prepared using a resin component (Examples 1 and 2) and cure system (Example 3). Four exemplary coating formulations and a comparative coating formulation were prepared as follows. For coating formulations 1, Resin A (100 g) was combined with Cure System 1 (18.1 g). For coating formulation 2, Resin A (100 g) was combined with Cure System 2 (17.8 g). For coating formulation 3, Resin A (100 g) was combined with Cure System 3 (17.6 g). For coating formulation 4, Resin B (100 g) was combined with Cure System 4 (39.3 g). For the comparative coating formulation 5, Resin C (100 g) was combined with Cure System 5 (18.1 g). The coating formulations are mixed with a stoichiometric ratio of amine equivalents to epoxy equivalents as follows: 0.96:1.00, 0.96:1.00, 0.96:1.00, 1.00:1.00 and 1.03:1.00 for coating formulations 1, 2, 3, 4, and 5, respectively. The resin component and the cure system were weighed into a container and stirred with a metal spatula until well mixed to provide a coating composition.

The resulting coating composition was sprayed onto steel panels using a DEVILBISS® spray gun and the coating allowed to cure to hardness (ASTM D1640). The panels coated with the compositions of the coating formulations were tested for percent elongation (conical mandrel, ASTM D522). The epoxy siloxane formulations (6 mils) were applied over 3 mils of a zinc rich epoxy primer and tested for resistance to salt spray/fog (ASTM B117) over 5000 hours. The panels were analyzed after 5000 hours for face blister (ASTM D714), face rusting (ASTM D1654), and scribe creepage (ASTM D1654). In a separate test, the epoxy siloxane formulations (6 mils) were applied over 3 mils of a zinc rich epoxy primer and tested for resistance to cyclic prohesion (ASTM D5894) over 5000 hours. The panels were analyzed after 5000 hours for face blister (ASTM D714), face rusting (ASTM D1654), and scribe creepage (ASTM D1654). Panels having the coating compositions were exposed to QUV accelerated weathering using a UV 313B bulb with 4 hours UV exposure/4 hours humidity alternating cycles (ASTM G53) and change in sixty degree gloss measured after 5 weeks, 10 weeks, and 15 weeks. The results of the tests are presented in Table 5.

The data demonstrates that epoxy siloxane coating compositions made according to the present disclosure display improved flexibility as measured by conical mandrel elongation, particularly after aging, than the comparative prior art composition. Weatherability and corrosion resistance tests showed that the epoxy siloxane coatings displayed improved properties over the comparative prior art composition.

TABLE 5

Coated Panels Test Results

| Coating Formulation | 1 | 2 | 3 | 4 | 5 |
|---|---|---|---|---|---|
| Amine eq:Epoxy eq. | 0.96 | 0.96 | 0.96 | 1.00 | 1.03 |
| Dry hard, ASTM D1640 Hours | 12.0 | 8.0 | 9.0 | 4.0 | 7.5 |
| Conical Mandrel-% Elongation ASTM D522 | | | | | |
| After 7 days @23.3° C./50% RH | 14.3 | 8.5 | 14 | 11 | 2 |
| After 3 days at 23.3° C. + 7 days CHT + 7 days 60° C. + 7 days CHT + 7 days 60° C. | 5.1 | 3 | 4.5 | 3.0 | 0 |
| Salt Fog, ASTM B117 | 6 mils epoxy siloxane topcoat formulas above applied over 3 mils zinc rich epoxy primer - 5000 hours exposure | | | | |
| Face Blisters, ASTM D714 | Size 8 Med. Dense | None | None | None | None |
| Face Rusting, ASTM D1654 | None | None | None | None | None |
| Scribe Creepage, mm, ASTM D1654 | 10 | 5.0 | 5.0 | 6.0 | 5.5 |
| Cyclic Prohesion, ASTM D5894 | 6 mils epoxy siloxane topcoat formulas above applied over 3 mils zinc rich epoxy primer - 5000 hours exposure | | | | |
| Face Blisters, ASTM D714 | Size 8 Few | None | None | None | None |
| Face Rusting, ASTM D1654 | None | None | None | None | none |
| Scribe Creepage, mm, ASTM D1654 | 6.0 | 2.2 | 2.5 | 4.0 | 3.5 |
| QUV Accelerated Weathering - UV313B Bulb - 4 hours UV/4 hours humidity alternating cycles | | | | | |
| Sixty degree gloss - initial | 92 | 92 | 92 | 92 | 92 |
| After 5 weeks | 63 | 68 | 68 | 61 | 63 |
| After 10 weeks | 52 | 60 | 62 | 50 | 51 |
| After 15 weeks | 35 | 55 | 55 | 38 | 40 |

Whereas particular embodiments of this invention have been described above for purposes of illustration, it will be appreciated by those skilled in the art that changes could be made to the various embodiments described herein without departing from the broad inventive concept thereof. It is understood, therefore, that this description is not limited to the particular embodiments disclosed, but is intended to cover modifications which are within the spirit and scope of the invention, as defined by the appended claims.

I claim:

1. An epoxy-polysiloxane polymer coating composition comprising:
   water;
   a polysiloxane having the formula

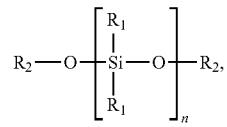

wherein
   (a) each $R_1$ is independently selected from a hydroxy group, an alkyl group having up to six carbon atoms, an aryl group having up to six carbon atoms, or an alkoxy group having up to six carbon atoms,
   (b) each $R_2$ is independently selected from a hydrogen, an alkyl group having up to six carbon atoms, or an aryl group having up to six carbon atoms, and
   (c) n is selected so that the molecular weight for the polysiloxane is in the range of 400 to 10,000;
   a non-aromatic epoxide resin comprising more than one 1,2-epoxide group per molecule and an epoxide equivalent weight in the range of from 100 to 5,000; and
   a cure system comprising a blend of alkoxy functional aminosilanes, where the blend has an average alkoxy functionality value ranging from 2.2 to 2.8,
   wherein the combined composition reacts to form a crosslinked epoxy polysiloxane polymer structure.

2. The coating composition of claim 1, wherein the blend comprises at least one dialkoxy functional aminosilane having the general formula

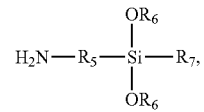

wherein
   (a) $R_5$ is a difunctional organic radical independently selected from aryl, alkyl, dialkylaryl, alkoxyalkyl, alkylaminoalkyl, or cycloalkyl radicals, wherein each alkyl, aryl, or alkoxy radical contains up to six carbon atoms, and
   (b) $R_6$ and $R_7$ are each independently selected from alkyl, hydroxyalkyl, alkoxyalkyl, or hydroxyalkoxyalkyl groups wherein each alkyl, aryl, or alkoxy group contains up to six carbon atoms.

3. The coating composition of claim 1, wherein cure system comprises a blend of at least one dialkoxy functional aminosilane and at least one trialkoxy functional aminosilane.

4. The coating composition of claim 3, wherein
   the at least one dialkoxy functional aminosilane has a general formula

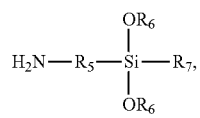

and the at least one trialkoxy functional aminosilane has a general formula

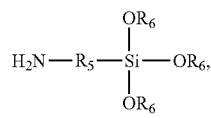

wherein
(a) each $R_5$ is a difunctional organic radical independently selected from aryl, alkyl, dialkylaryl, alkoxyalkyl, alkylaminoalkyl, or cycloalkyl radicals, wherein each alkyl, aryl, or alkoxy radical contains up to six carbon atoms, and
(b) $R_6$ and $R_7$ are each independently selected from alkyl, hydroxyalkyl, alkoxyalkyl, or hydroxyalkoxyalkyl groups wherein each alkyl, aryl, or alkoxy group contains up to six carbon atoms.

5. The coating composition of claim 4, wherein each $R_6$ and $R_7$ is independently chosen from $(C_1-C_6)$alkyl groups and each $R_5$ is independently chosen from $(C_1-C_6)$alkyl groups or $(C_1-C_6)$alkylamino$(C_1-C_6)$alkyl groups.

6. The coating composition of claim 4, wherein
the at least one dialkoxy functional aminosilane is selected from aminopropylmethyldimethoxysilane, aminopropylethyldimethoxysilane, aminopropylethyldiethoxysilane, N—P-aminoethyl-γ-aminopropylmethyldimethoxysilane, N-2-aminoethyl-3-aminoisobutylmethyldimethoxysilane or aminoneohexylmethyldimethoxysilane; and
the at least one trialkoxy functional aminosilane is selected from aminopropyltrimethoxysilane, aminopropyltriethoxysilane, aminopropyltripropoxysilane, aminoneohexyltrimethoxysilane, N—P-aminoethyl-γ-aminopropyltrimethoxysilane, N-l3-aminoethyl-γ-aminopropyltriethoxysilane, N-phenylaminopropyl trimethoxysilane, trimethoxysilylpropyl diethylene triamine, 3-(3-aminophenoxy)propyl trimethoxysilane, aminoethyl aminomethyl phenyl trimethoxysilane, 2-aminoethyl-3-aminopropyl-tris-2-ethylhexoxysilane, N-aminohexyl aminopropyl trimethoxysilane, or trisaminopropyl trismethoxyethoxysilane.

7. The coating composition of claim 1, wherein the coating composition comprises from 20% to 80% by weight of the polysiloxane, from 20% to 80% by weight of the non-aromatic epoxy resin, and from 5% to 40% by weight of the cure system.

8. The coating compositions of claim 1, wherein the coating compositions comprises a ratio of amine equivalents to epoxide equivalents ranging from 0.7:1.0 to 1.3:1.0.

9. The coating composition of claim 1, wherein the non-aromatic epoxide resin is selected from cycloaliphatic epoxide resins comprising hydrogenated cyclohexane dimethanol or diglycidyl ethers of hydrogenated Bisphenol A epoxide resins.

10. The coating composition of claim 1, further comprising a flexible epoxy resin based on the glycidyl ether of castor oil having an epoxide equivalent weight in the range of 200 to 1,000.

11. The coating composition of claim 10, wherein the coating composition comprises up to 15% by weight of the flexible epoxy resin.

12. The coating composition of claim 1, further comprising a cure accelerator comprising at least one metal catalyst selected from a zinc, manganese, zirconium, titanium, cobalt, iron, lead, or tin catalyst, each in the form of octanoates, neodecanoates, or naphthanates.

13. The coating composition of claim 12, wherein the coating composition comprises up to 10% by weight of the cure accelerator.

14. The coating composition of claim 1, further comprising one or more corrosion inhibitor selected from zinc or phosphate based corrosion inhibitors or organic corrosion inhibitors.

15. The coating composition of claim 1, further comprising at least one additional ingredient selected from pigments, aggregates, rheological modifiers, plasticizers, antifoam agents, thixotropic agents, pigment wetting agents, bituminous and asphaltic extenders, antisettling agents, diluents, UV light stabilizers, air release agents, dispersing aids, solvents, or mixtures of any thereof.

16. An epoxy-polysiloxane polymer coating composition comprising:
water;
from 20% to 80% by weight of a polysiloxane having the formula:

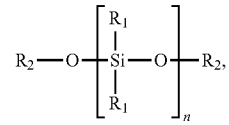

wherein
(a) each $R_1$ is independently selected from a hydroxy group, an alkyl group having up to six carbon atoms, an aryl group having up to six carbon atoms, or an alkoxy group having up to six carbon atoms,
(b) each $R_2$ is independently selected from a hydrogen, an alkyl group having up to six carbon atoms, or an aryl group having up to six carbon atoms, and
(c) n is selected so that the molecular weight for the polysiloxane is in the range of 400 to 10,000;
from 20% to 80% by weight of a non-aromatic epoxy resin comprising more than one 1,2-epoxide group per molecule and an epoxide equivalent weight in the range of from 100 to 5,000;
up to 15% by weight of a cure accelerator comprising a tin catalyst in the form of an octanoate, a dodecanoate or a naphthanate;
up to 15% by weight of a flexible epoxy resin based on the glycidyl ether of castor oil having an epoxide equivalent weight in the range of 200 to 1,000; and
from 5% to 40% by weight of a cure system comprising a blend of at least one dialkoxy functional aminosilane and at least one trialkoxy functional aminosilane, wherein the dialkoxy functional aminosilane has a general formula

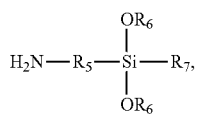

and
the trialkoxy functional aminosilane has a general formula

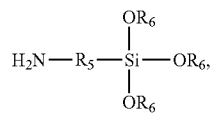

wherein
(a) each $R_5$ is a difunctional organic radical independently selected from aryl, alkyl, dialkylaryl, alkoxyalkyl, alkylaminoalkyl, or cycloalkyl radicals, wherein each alkyl, aryl, or alkoxy radical contains up to six carbon atoms, and
(b) $R_6$ and $R_7$ are each independently selected from alkyl, hydroxyalkyl, alkoxyalkyl, or hydroxyalkoxyalkyl groups wherein each alkyl, aryl, or alkoxy group contains up to six carbon atoms,
(c) where the blend has an average alkoxy functionality value ranging from 2.2 to 2.8 and is added in an amount sufficient to provide an amine equivalent to epoxide equivalent of from 0.7:1.0 to 1.3:1.0 in the coating composition,
wherein the combined composition reacts to form a crosslinked epoxy polysiloxane polymer structure.

17. The coating composition of claim 16, wherein each $R_6$ and $R_7$ is independently chosen from $(C_1$-$C_6)$alkyl groups and each R5 is independently chosen from $(C_1$-$C_6)$alkyl groups or $(C_1$-$C_6)$alkylamino$(C_1$-$C_6)$alkyl groups.

18. The coating composition of claim 16, wherein
the at least one dialkoxy functional aminosilane is selected from aminopropylmethyldimethoxysilane, aminopropylethyldimethoxysilane, aminopropylethyldiethoxysilane, N—P-aminoethyl-y-aminopropylmethyldimethoxysilane, N-2-aminoethyl-3-aminoisobutyl-methyldimethoxysilane or aminoneohexylmethyldimethoxysilane; and
the at least one trialkoxy functional aminosilane is selected from aminopropyltrimethoxysilane, aminopropyltriethoxysilane, aminopropyltripropoxysilane, aminoneohexyltrimethoxysilane, N—P-aminoethyl-y-aminopropyltrimethoxysilane, N-l3-aminoethyl-y-aminopropyltriethoxysilane, N-phenylaminopropyl trimethoxysilane, trimethoxysilylpropyl diethylene triamine, 3-(3-aminophenoxy)propyl trimethoxysilane, aminoethyl aminomethyl phenyl trimethoxysilane, 2-aminoethyl-3-aminopropyl-tris-2-ethylhexoxysilane, N-aminohexyl aminopropyl trimethoxysilane, or trisaminopropyl trismethoxyethoxysilane.

19. The coating composition of claim 16, further comprising at least one additional ingredient selected from pigments, aggregates, rheological modifiers, plasticizers, antifoam agents, thixotropic agents, pigment wetting agents, bituminous and asphaltic extenders, antisettling agents, diluents, UV light stabilizers, air release agents, dispersing aids, solvents, or mixtures of any thereof.

20. A coated substrate comprising at least one surface coated with the coating composition according to claim 1.

21. A method for coating a surface with a coating composition, the method comprising:
preparing a resin component comprising:
water;
a polysiloxane having the formula

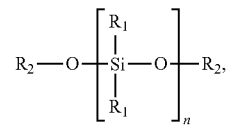

wherein
(a) each $R_1$, is independently selected from a hydroxy group, an alkyl group having up to six carbon atoms, an aryl group having up to six carbon atoms, or an alkoxy group having up to six carbon atoms,
(b) each $R_2$ is independently selected from a hydrogen, an alkyl group having up to six carbon atoms, or an aryl group having up to six carbon atoms, and
(c) n is selected so that the molecular weight for the polysiloxane is in the range of 400 to 10,000; and
a non-aromatic epoxide resin comprising more than one 1,2-epoxide group per molecule and an epoxide equivalent weight in the range of from 100 to 5,000;
adding a cure system to the resin component to form a fully cured epoxy-modified polysiloxane coating composition, the cure system comprising:
a blend of at least one dialkoxy functional aminosilane and at least one trialkoxy functional aminosilane; and
optionally a cure accelerator comprising at least one metal catalyst,
where the blend has an average alkoxy functionality value ranging from 2.2 to 2.8; and
applying the coating composition to the surface of a substrate before the coating composition becomes fully cured,
wherein the coating composition protects the surface of the substrate from the undesired effects of one or more of chemicals, corrosion and weather.

22. The method of claim 21, wherein the resin component further comprises a flexible epoxy resin based on the glycidyl ether of castor oil having an epoxide equivalent weight in the range of 200 to 1,000.

23. An epoxy-polysiloxane polymer coating composition comprising:
water;
a polysiloxane having the formula

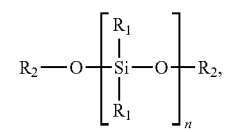

wherein
(a) each $R_1$ is independently selected from a hydroxy group, an alkyl group having up to six carbon atoms, an aryl group having up to six carbon atoms, or an alkoxy group having up to six carbon atoms,
(b) each $R_2$ is independently selected from a hydrogen, an alkyl group having up to six carbon atoms, or an aryl group having up to six carbon atoms, and (c) n is selected so that the molecular weight for the polysiloxane is in the range of 400 to 10,000;

a non-aromatic epoxide resin comprising more than one 1,2-epoxide group per molecule and an epoxide equivalent weight in the range of from 100 to 5,000;

a cure system comprising a blend of alkoxy functional aminosilanes, where the blend has an average alkoxy functionality value ranging from 2.2 to 2.8; and a flexible epoxy resin based on the glycidyl ether of castor oil having an epoxide equivalent weight in the range of 200 to 1,000;

wherein the combined composition reacts to form a cross-linked epoxy polysiloxane polymer structure.

24. A coated substrate comprising at least one surface coated with the coating composition according to claim 23.

* * * * *